US011519701B2

(12) United States Patent
Taheri et al.

(10) Patent No.: US 11,519,701 B2
(45) Date of Patent: Dec. 6, 2022

(54) DEVICE FOR DISRUPTING BINOCULAR VISION

(71) Applicant: IMMOBILEYES INC., Kent, OH (US)

(72) Inventors: Bahman Taheri, Shaker Heights, OH (US); Antonio Munoz, Shaker Heights, OH (US)

(73) Assignee: IMMOBILEYES INC., Kent, OH (US)

( * ) Notice: Subject to any disclaimer, the term of this patent is extended or adjusted under 35 U.S.C. 154(b) by 0 days.

(21) Appl. No.: 17/531,860

(22) Filed: Nov. 22, 2021

(65) Prior Publication Data

US 2022/0163297 A1 May 26, 2022

Related U.S. Application Data

(60) Provisional application No. 63/116,291, filed on Nov. 20, 2020.

(51) Int. Cl.
*F41H 13/00* (2006.01)
*G02F 1/01* (2006.01)

(52) U.S. Cl.
CPC ....... *F41H 13/0087* (2013.01); *G02F 1/0121* (2013.01)

(58) Field of Classification Search
CPC ............................. F41H 13/0087; G02F 1/0121
See application file for complete search history.

(56) References Cited

U.S. PATENT DOCUMENTS

| 8,051,761 | B1 * | 11/2011 | Ullman | F41H 13/0056 89/1.11 |
|---|---|---|---|---|
| 8,267,518 | B2 * | 9/2012 | Welch | F41H 13/0056 351/205 |
| 9,857,149 | B2 * | 1/2018 | Rubtsov | F21L 4/027 |
| 10,495,422 | B2 * | 12/2019 | Palti | H05B 47/16 |
| 10,567,106 | B2 * | 2/2020 | Thum-Jaeger | H04K 3/822 |

* cited by examiner

*Primary Examiner* — Arman B Fallahkhair
(74) *Attorney, Agent, or Firm* — Atossa Alavi; Alavi IP, LLC

(57) ABSTRACT

A visual impairment device includes a light source, a modulator, and a controller. The light source capable of generating two or more high intensity light beams having different peak wavelengths, wherein at least one of the light beams has a wavelength bandwidth of less than 100 nm. The modulator modulates the two or more beams of intense light to produce a spatial array comprising a first array of first light beams having a first peak wavelength and a second array of second light beams having a second peak wavelength different from the first wavelength. The controller includes control circuitry for controlling the light source, the modulator, or both. The spatial array is projected into a space such that a lateral distance of at least one first light beam to a second light beam is in a range of 40-110 mm within at least one area of the space.

23 Claims, 10 Drawing Sheets

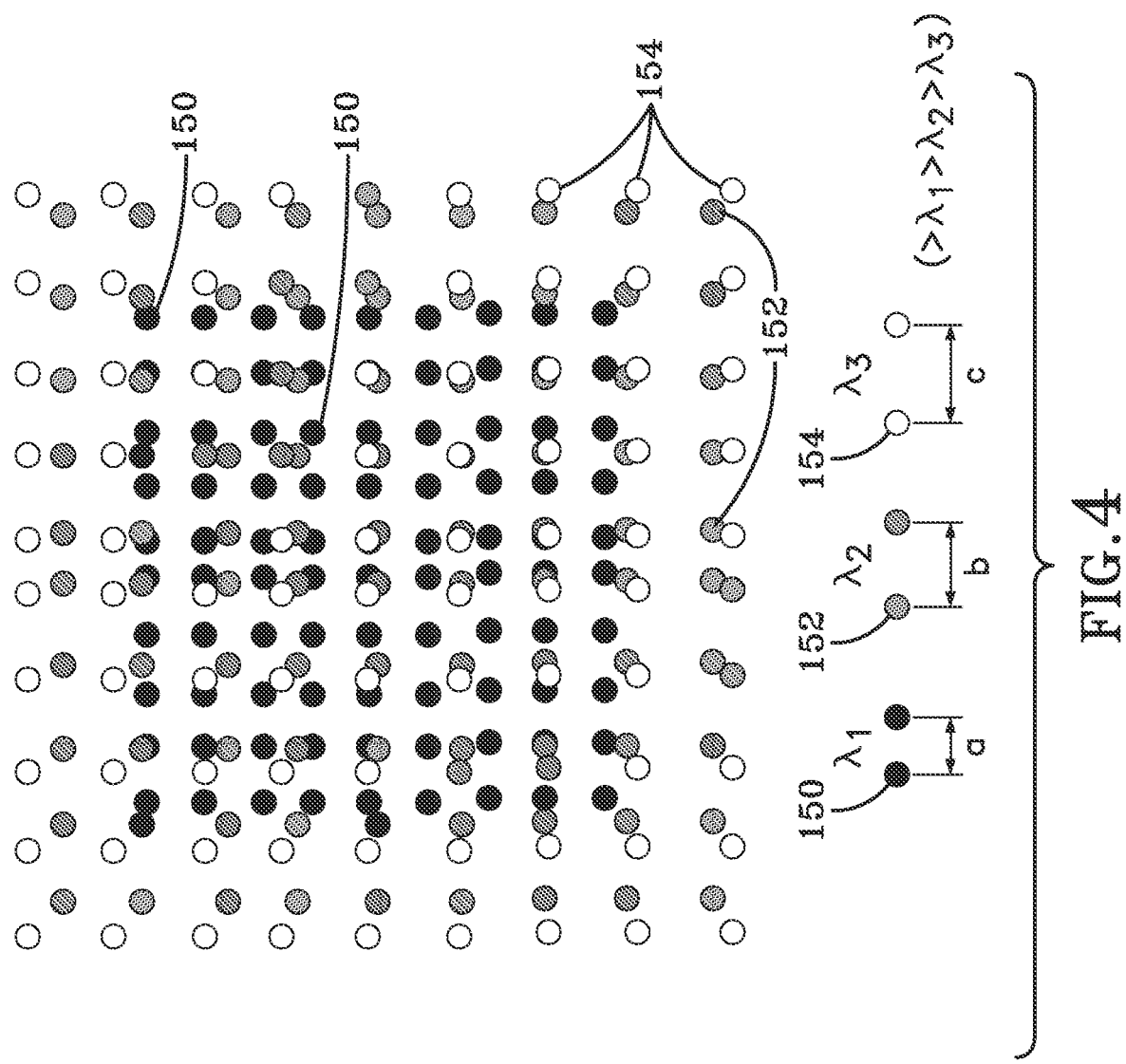

DEVICE FOR DISRUPTING BINOCULAR VISION

CROSS-REFERENCE TO RELATED APPLICATION

This application claims priority to, and any other benefit of, U.S. Provisional Patent Application No. 63/116,291 filed on Nov. 20, 2020, entitled "Laser Shield Device", the entire disclosure of which is hereby incorporated by reference.

TECHNICAL FIELD

The following invention relates to visual impairment devices to distract and/or to deter intruders, active shooters and other potential threats.

BACKGROUND

In the current environment of rising school shootings, effective safety measures are a necessity. However, many school and university buildings are constructed to achieve an inviting and open campus style, with multiple buildings, multiple entrances and exits, and big windows. Unfortunately, these design configurations are not conducive to security and lockdown. One security solution is to immobilize or disable a potential shooter or intruder at an entrance or other location for a period of time, long enough for law enforcement to respond to the situation.

A well-known phenomenon in aviation is laser-induced vision impairment. High power LEDs and lasers are highly flexible bright light sources that are particularly suited to interfere with human vision, because they are: 1) inexpensive and readily available, 2) non-lethal, 3) can be adjusted to cause only temporary incapacitation (e.g. glare, flash-blindness or dazzle) without causing permanent injury and 4) can be exceedingly hard to protect against. These LEDs and lasers can easily be varied in intensity, color (wavelength), size, modulation, frequency etc. and as such are very versatile.

For instance, laser-induced visual disturbance, temporal blindness and eye damage is a well-known and major problem for airline pilots who are attacked by bystanders with laser pointers. Handheld laser pointer attacks against pilots are difficult to stop because the perpetrator can be located at a long distance from the target point. These devices cause temporary blindness of the pilot after just one exposure. Therefore, an attacker can effectively impair a pilot's vision by simply pointing a laser at a pilot who is seated in a cockpit.

In the military, laser light dazzlers are known and have been used offensively to disable enemy combatants. See, e.g. U.S. Pat. No. 7,483,454. These devices, however, are complicated to design, build and use because they all require components that enable a user to precisely point a single beam towards a target's eyes. They also require a projection system that will collimate and direct the beam, with precise controls in order to alter the divergence of the beam depending on the distance from the target, etc. See e.g. Donne at al, (2006), Multi-wavelength Optical Dazzler for Personnel and Sensor Incapacitation, Proc. of SPIE Vol. 6219, 621902 (2006), and Upton et al. (2004) Smart, white-light dazzler, in Sensors, and Command, Control, Communications, and Intelligence (C3I) Technologies for Homeland Security and Homeland Defense III, E. M. Carapezza, ed. Proc. Of SPIE Vol. 5403 (SPIE, Bellingham, Wash. 2004). Because of their need for accuracy in the exact location of the target, these devices cannot effectively disable an intruder whose exact eye location is unknown.

In the real world, the problem is that it is not always possible to know the exact position of an intruder's eye, and it is difficult to precisely point a laser "gun" at a moving intruder. Rather, the laser device needs to create a "No-Go" zone to deter a person from entering an area, or to disorient and distract a person that enters that area, without the need to point at a particular target's eye. None of the previously described devices work in this manner and as such, are ineffective for both of the above goals. Thus, there remains a need for a device that is easy to operate and that can cover an area to deter the entry of one or more intruders into that area.

SUMMARY

In accordance with an embodiment of this disclosure, a visual impairment device includes a light source, a modulator, and a controller. The light source capable of generating two or more high intensity light beams having different peak wavelengths, wherein at least one of the light beams has a wavelength bandwidth of less than 100 nm. The modulator modulates the two or more beams of intense light to produce a spatial array comprising a first array of first light beams having a first peak wavelength and a second array of second light beams having a second peak wavelength different from the first wavelength. The controller includes control circuitry for controlling the light source, the modulator, or both. The spatial array is projected into a space such that a lateral distance of at least one first light beam to a second light beam is in a range of 40-110 mm within at least one area of the space.

In accordance with another embodiment of this disclosure, a method of disrupting the binocular vision of a person entering a space is disclosed. The method includes directing a first intense light beam having a first peak wavelength into the person's first eye and directing a second intense light beam having a second peak wavelength different from the first peak wavelength into the person's other eye. The first and second light beams are provided by a visual impairment device including a light source, a modulator, and a controller. The light source generates two or more high intensity light beams having different peak wavelengths. The modulator modulates the two or more high intensity light beams to produce the first and second light beams, wherein at least one of the light beams has a wavelength bandwidth of less than 100 nm. The controller controls the light source, the modulator, or both.

BRIEF DESCRIPTION OF DRAWINGS

FIG. 4 is a schematic drawing of an example of different spatial array patterns for lights having different wavelengths.

DETAILED DESCRIPTION

Figure 1:
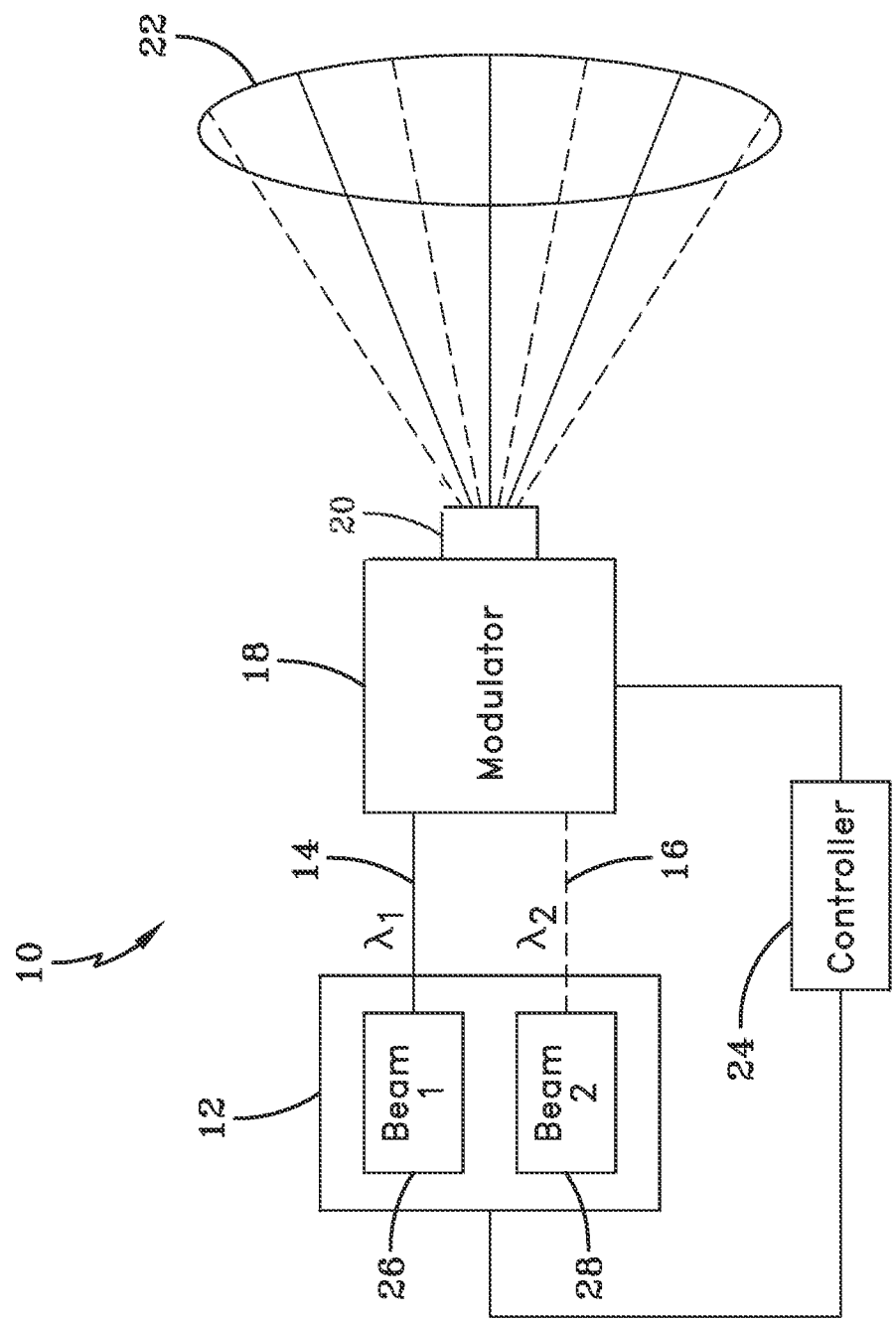
FIG. 1 is a schematic drawing of an example of the device described herein.

Herein is described various embodiments for a visual impairment device (sometimes referred to herein as a "light shield device" or just "device") having a light source of two or more beams of intense light, and a modulator for modulating the beams of light to produce a spatial array such that at least one of the beams used to produce the spatial array has the requisite irradiance to cause visual impairment when hitting the eye of a person (e.g., a potential active shooter, intruder, etc). Various embodiments are also described in International Application PCT/US2019/033056 filed May 20, 2019, entitled "Light Shield Device", the entire contents of which are hereby incorporated by reference for all purpose. In some embodiments, the device operates to illuminate and create a "No-Go" or "visual impairment" zone without the need to track, pinpoint or target a person's eyes. Rather, a person entering the visual impairment zone will be visually impaired because it will be difficult to avoid the intense light beams unless the person drops their gaze, or averts his eyes away from the incoming light in the spatial array. Thus, such a device does not have any component or means for tracking or targeting a single person. There is no need to have an accurate aiming control unit or means for measuring range or distance of target persons themselves. As described later, in some other embodiments, the visual impairment device may include tracking or targeting mechanisms, for example, to produce binocular visual impairment effects.

In some embodiments, the device, as contemplated, includes one or more light sources that are modulated to "cover" an area with a pattern of light beams, referred to herein as a spatial array of light. The modulation of the beams of light can occur either temporally or spatially. For example, one or more beams of light can be spatially modulated to produce a predetermined pattern of light beams to produce a spatial array that, when projected onto a surface, may appear as spots, lines, line segments, or other shapes. Alternatively, or in addition, a modulator can cause a spatial array by temporally modulating light by moving one or more beams of light across a space in a predetermined pattern using, for example, a light steering or scanning mechanism such as a rastering system. In some embodiments, a modulator may include components that spread the light beam(s) in at least one direction (e.g., horizontally, vertically, at an angle, or some combination) and may further include components that allow the spread light beam(s) to be scanned within a target area. Such scanning may be in a direction other than the beam spreading direction. In some cases, the scanning direction may be approximately orthogonal to the beam spreading direction. In a non-limiting example, a horizontally-spread light beam may be scanned in a vertical direction by changing the angle of projection in the vertical dimension as a function of time. In some cases, an initially horizontally-spread light beam may be rotated about an axis over time as another form of scanning.

FIG. 1 represents a general example of the light shield device 10 according to some embodiments of the present disclosure. The device 10 includes a power supply (not shown), an intense light source 12 capable of producing two or more beams (26, 28) of intense light (14, 16) having different peak wavelengths ($\lambda 1$ and $\lambda 2$, respectively), and a modulator 18. The modulator 18 can include various means of modulating the intense light beams to create various patterns of light. The modulator 18 or in some examples, a projector 20 directs the modulated beams of intense light in a discrete spatial array or pattern 22 such that at least one of the beams has the requisite irradiance to cause visual impairment.

The modulator component 18 can alter the temporal and/or spatial aspects of the intense light source 12 to create: (a) a spatial array of intense light projected onto a targeted area made by one or more beams of light being split into a plurality of beams to produce a pattern of discrete beams separated by a preselected distance, and/or (b) a spatial array of intense light projected onto a targeted area made by one or more beams modulated temporally to produce a beam rastering/steering pattern. As used herein, a "spatial array" is any pattern or patterns of light illuminating a zone or area that can be produced by spatially or temporally modulating light. The pattern may be spots, lines, or any geometric pattern (rectangle, diamond, oval, irregular shape, etc.) having multiple elements.

Device 10 has a controller 24 including circuitry that can act to turn the device ON and OFF, either manually, automatically, remotely or a combination thereof. In some embodiments, the controller 24 can also be used to adjust various parameters of the device such as: beam wavelength, direction, pattern, motion, power and intensity. If using a pulsed laser beam, the pulse power, duration and frequency, etc. can also be adjusted. If these parameters are adjusted, characteristics associated with the spatial array will also be adjusted. The controller 24 may add additional elements, such as switching between beams, strobing effect, or any variation in the beams or pattern being projected.

The discrete spatial array or pattern of beams 22 eliminates the need for precise accuracy (i.e. no need for an aiming mechanism to target a person's eye) and makes it very difficult to avoid the beams for a person entering the No-Go zone. In the spatial array of beams 22, each beam may have a stationary (static) pattern, or it may be moving to create a dynamic or temporal pattern, or a combination thereof. In addition, the patterns may be altered at different times (e.g. there may be one pattern in the first X seconds, a different pattern in the next Y seconds, and so on) to produce a varying spatial array. In other examples, the beams or patterns may be pulsing on and off, together or separately, for various strobing effects.

The intense light beams have different peak wavelengths and a wavelength bandwidth less than 100 nm. In some examples, the wavelength bandwidth is less than 50, 40, 30, 20, 15, 10, 9, 8, 7, 6, 5, 4, 3, 2, 1 or 0.5 nm. In some embodiments, the beams of intense light may be a laser light (pulsed or continuous wave lasers). In some examples, they may be a LED light is capable of causing visual impairment or other light sources. In some embodiments, the beams of intense light may be sourced from a xenon, mercury, or other high intensity lamp and sent through a color filter to produce the desired bandwidth and optionally through collimating lenses. "Intense light", as used herein, refers to a beam of light having an irradiance equivalent to X.MPE, where X is 0.1, 0.5, 0.7, 1, 2, 3, 4, 5, 6, 7, 8, 9, 10, 20, 30, 40, 50, 100, 500, or more, and MPE is the Maximum Permissible Exposure according to ANSI Z136.1. The irradiance, intensity and/or energy of the intense light can be adjusted in accordance with the use case, e.g. if the device is used to impair sensors or a camera or other mechanical device, the concern of being at or below the MPE is lifted.

In some examples, the two or more intense light beams may come from a single source. In some examples, the peak wavelengths separation or difference between the two intense light beams is 0.5 nm. In some examples, the two wavelengths from the source may be emitted in sequence. In other examples, the two wavelengths from the source may be emitted simultaneously. In some examples, the two wavelengths from the source may be emitted in a wavelength hopping manner.

In some examples, the light beams in the spatial array are laser beams that can cause temporary visual impairment but not permanent eye damage (as defined in ANSI Z136.1).

In some embodiments, the device projects at least one beam in the visible light range (400-700 nm) and at least one beam in the invisible light range (e.g. ultraviolet or infrared wavelengths). It should be noted that other light sources (for example having a wavelength bandwidth more than 100 nm, such as white light, etc.) may also be added to the system to achieve different or variable visual effects.

In some embodiments, the device, when on, produces a warning sound, light or both. In some examples, the warning sound can be a loud sound (e.g. flash bang), which is known to cause pupillary dilation and thus increase the target person's vulnerability to light. Other examples of sound include a warning voice or message, alarm or siren, etc.

The device can be manually controlled, automatically controlled or designed to be remotely controlled by an operator not in the immediate vicinity of the targeted person (e.g. principal's office, local police station, etc.).

The device is designed such that one or more beams of light used to produce the spatial array has the requisite irradiance to cause visual impairment. In a spatial array made of static light spots, one or more light spots have the requisite irradiance. In a spatial array made by rastering a beam, the beam that is being rastered has the requisite irradiance.

The design of the device can be varied depending on a number of parameters, including the visual impairment factors, environment factors, modulator factors, and light source factors. The system requirements to achieve visual impairment factors include the irradiance required at each wavelength to achieve the effect, the duration of illumination, the duration of persistence of the illumination, the factors related to whether the intruder is wearing protective eyewear, etc. The environmental factors include the size and shape of the area being illuminated (the "NO-GO visual impairment zone"), range to the targeted intruder, and the presence of scatterers, reflectors, and other environment elements. The modulator factors include the size of the projector as required, the divergence and pattern of the projected beams, the uniformity of illumination, and the pattern (static or dynamic). The light source factors include the irradiance available at each wavelength of light, the wavelength of the beam, and the temporal modulation of the light beams.

The effects and impacts of each of the factors are discussed as follows.

Visual Impairment Factors

"Visual impairment", as used herein, means any impairment of vision that can inhibit, complicate or interfere with functional vision, and/or make target identification or localization more difficult, through the introduction of intense light in the field of view. Visual impairment includes photophobia or photosensitivity as visual discomfort and aversion, glare, flash blindness, startle and/or distraction. In some cases, the visual impairment may include disrupted binocular vision.

A fundamental function of the retina is to achieve clarity of visual images of objects. The retina processes light through a layer of photoreceptors. When an exposed light source is present in the field of view, the visibility of neighboring objects is impaired due to the visual effects of laser exposure. Distraction/startle, glare/disruption, and flash blindness are all transitory visual effects associated with laser exposure.

"Photophobia" (discomfort and aversion) refers to a sensory disturbance provoked by light. The term "photophobia" (derived from the Greek words "photo" meaning "light" and "phobia" meaning "fear") means, literally, "fear of light" and is a sensory state of light-induced ocular or cranial discomfort, and/or subsequent tearing and squinting.

"Distraction" occurs when an unexpected bright light (e.g. laser or other bright light) distracts a person from performing certain tasks. A secondary effect may be "startle" or "fear" reactions.

"Glare" (sometimes called "dazzle") refers to the temporary inability to see detail in the area of the visual field around a bright light (such as an oncoming car's headlights). Glare is not associated with biological damage. It lasts only as long as the bright light is actually present within the individual's field of vision. Laser glare can be more intense than solar glare and in dark surroundings, even low levels of laser light may cause significant inconvenient glare. Glare that impairs vision is called disability glare. A subtype of glare. "disability glare" is primarily caused by the diffractions and scattering of light inside the eye due to the imperfect transparency of the optical components of the eye and to a lesser extent by diffuse light passing through the scleral wall or the iris. The scattered light overlays the retinal image, thus reducing visual contrast. This overlaying scattered light distribution is usually described as a veiling luminance.

"Flash blindness" is a temporary visual loss following a brief exposure to an abrupt increase in the brightness of all or part of the field of view, similar in effect to having the eyes exposed to a camera flashlight. It is a temporary loss of vision produced when retinal light-sensitive pigments are bleached by light more intense than that to which the retina is physiologically adapted at that moment. An "afterimage", which moves with the eye, persists for several seconds to several minutes after the light source is turned off. This afterimage produces a temporary scotoma (blind spot) in the visual field in which targets are either partially or completely obscured. The time required for temporary flash blindness-induced scotomas to fade increases with the brightness and duration of the light insult. The time it takes before the ability to perceive targets returns depends on several factors, including target contrast, brightness, color, size, observer age, and the overall adaptation state of the visual system.

Typically, complete dark adaptation of the visual system takes longer, e.g. 20 to 30 minutes, whereas adaptation to an environment of bright light is usually faster, e.g. completed within 2 minutes. So, under scotopic conditions (low light level or night time light levels), flash blindness will be most drastic and easiest to achieve.

"Disrupted binocular vision" may include visual disturbances that are the result of different optical stimuli (color, pattern, intensity, or a combination) in each eye. In some cases, the dissimilar stimuli may cause discomfort, uneven or blurred vision, confusion, imbalance, distraction, nausea, headaches or other disruptive effects. In some cases, the disrupted vision may include disruption of saccadic eye movement, saccadic masking, reflexive visual responses, vestibule-ocular movement, or dichoptic vision. For example, exposing one eye to red light and the other eye to blue light (or some other set of differing colors) may result in a discomfort or confusion over and above the disturbance caused in each eye individually. In some cases, disrupted binocular vision may include a distortion of depth perception such as by chromostereopsis. For example, a red image in one eye and a blue image in the other may be perceived as having different distances, thereby confusing or disorienting the person. Alternatively, spatially mismatched patterns or images in each eye (whether the colors is the same or different) may confuse a person, e.g., by making it difficult to properly focus.

In some embodiments, the visual impairment effects described above are temporary bio-effects and do not cause permanent eye damage.

Irreversible Effects (Permanent Damage)

Permanent or irreversible bio-effects include thermal and hemorrhagic lesions. Thermal lesions are burns of the retinal tissue that result in permanent scotomas. Hemorrhagic lesions are ruptures of the retinal and subretinal blood vessels resulting from thereto-acoustical shockwaves induced in the eye by laser pulses. Simply stated, the light source deposits energy into the eye, which rapidly heats up and produces a shock wave due to the expansion of the vitreous humor, which tears the thin photoreceptor layer of the retina. Lesions can produce immediate and severe permanent visual disruption.

In order to understand the relationship between irradiance and visual impairment, we will begin by providing details regarding the system characteristics as defined by current ANSI Z136.1 protocols.

In some embodiments of the device, continuous wave lasers (that continuously pump and emit light) and/or pulse lasers (lasers where the optical power appears in pulses of some duration at a repetitive rate) can be utilized as light sources. These lasers can be associated with either visible or nonvisible (IR and UV) wavelengths. Possible source-wavelength combinations can be viewed below (Table 1).

TABLE 1

| Source | Wavelength | Combinations |
| --- | --- | --- |
| Pulse Source | Visible, IR, or UV | Pulse-Visible, Pulse-IR, Pulse-UV |
| Continuous Wave (CW) Source | Visible, IR, or UV | CW-Visible, CW-IR, CW-UV |

Some guidelines exist for lasers and their effect on visual impairment. These guidelines account for the energy, duration of impact, and area of impact. All three metrics can be used to sufficiently measure how laser exposure impacts the human eye. For example, the ANSI standard can be used in order to provide reasonable and adequate guidance for the use of lasers and laser systems. This standard defines a maximum permissible exposure (MPE), which is the laser radiation to which an unprotected person may be exposed without adverse biological changes in the eye or skin. In general terms, MPE is usually taken as 10% of the threshold irradiance that has a 50% probability of causing permanent damage under worst-case conditions.

Table 2 sets out the current ANSI standard for the irradiance ($W/cm^2$) threshold for different visual impairment effects.

TABLE 2

ANSI threshold irradiance ($W/cm^2$) for different visual impairment effects

| Visual Effect | Irradiance Threshold ($W/cm^2$) |
| --- | --- |
| Maximum Permissible Exposure (MPE) | $2.5 \times 10^{-3}$ |
| Afterimages, flashblindness | $1 \times 10^{-4}$ |
| Glare | $5 \times 10^{-6}$ |
| Startle, distraction | $5 \times 10^{-8}$ |

Table 3 shows some examples taken from current ANSI Z136.1 Table 5a, sets out the Maximum Permissible Exposure (MPE) for point source ocular exposure to a laser beam.

TABLE 3

ANSI MPE values for point source ocular exposure to a laser beam

| Wavelength (nm) | Exposure Duration (s) | MPE: H ($J/cm^2$) | MPE ($W/cm^2$) | |
| --- | --- | --- | --- | --- |
| 315-400 | 10 to $3 \times 10^4$ | 1 | | Photochemical Effects |
| 400-700 | $18 \times 10^{-6}$ to 10 | $1.8\ t^{0.75} \times 10^{-3}$ | | Visible Effects |
| 400-450 | 10 to 100 | $1 \times 10^{-2}$ | | Photochemical Effects |
| 500-700 | 10 to $3 \times 10^4$ | | $1 \times 10^{-3}$ | Visible Effects |
| 700-1050 | $18 \times 10^{-6}$ to 10 | $1.8\ C_A t^{0.75} \times 10^{-3}$ | | $C_A = 10^{2(\lambda-0.7)}$; $\lambda$ in μm |

Table 4 shows some examples, taken from ANSI Z136.1 Table 5b, of Maximum Permissible Exposure (MPE) for extended source ocular exposure to a laser beam.

TABLE 4

ANSI MPE for extended source ocular exposure to a laser beam

| Wavelength (nm) | Exposure Duration (s) | MPE: H ($J/cm^2$) | MPE ($W/cm^2$) | |
| --- | --- | --- | --- | --- |
| 400-700 | $18 \times 10^{-6}$ to 0.7 | $1.8\ C_E t^{0.75} \times 10^{-3}$ | | Visible Effects $C_E = 1$ for $\alpha < \alpha_{min}$ $C_E = \alpha/\alpha_{min}$; $\alpha_{min} < \alpha < \alpha_{max}$ |
| 400-700 | 0.7 to $T_2$ | $1.8\ C_E t^{0.75} \times 10^{-3}$ | | Thermal Effects $C_E = 1$ for $\alpha < \alpha_{min}$ $C_E = \alpha/\alpha_{min}$; $\alpha_{min} < \alpha < \alpha_{max}$ $T_2 = 10$ s for $\alpha < 1.5$ mrad; $T_2 =$ |

TABLE 4-continued

ANSI MPE for extended source ocular exposure to a laser beam

| Wavelength (nm) | Exposure Duration (s) | MPE: H (J/cm$^2$) | MPE (W/cm$^2$) |
|---|---|---|---|
| 700-1050 | 18 × 10$^{-6}$ to T$_2$ | 1.8 C$_A$C$_E$t$^{0.75}$ × 10$^{-3}$ | 100 for α > 100 s mrad T$_2$ = 10 × 10$^{(\alpha-1.5)/98.5}$ C$_A$ = 10$^{2(\lambda-0.7)}$; λ in μm |

Each of the combinations in Table 1 have a damage threshold that depends on the amount of energy, where said energy can be determined using the formula: (E)=Power (P)×Time (T). For example, when the eye is exposed to a CW laser beam at 532 nm (peak emission), with a spot size of 0.7 cm in diameter, 0.5 mW (5×10$^{-4}$ watts) of power and for a time period of 250 ms (0.25 seconds, which is the typical blink time), the Energy (E)=(5×10$^{-4}$ W)×(0.25 sec)= 1.25×10$^{-4}$ J=1.25×10$^{-1}$ mJ. When referring to Table 3, the MPE for visible lasers for wavelength between 0.4 and 0.7 μm for exposure duration from 18 μs to 10 s is given by:

MPE:$H$=1.8$t^{3/4}$ mJ/cm$^2$

For a 0.25 s exposure, the MPE:H is 1.8×0.25$^{3/4}$ mJ/cm$^2$= (1.8×0.354) mJ/cm$^2$=0.637 mJ/cm$^2$. For a single exposure, the irradiance of the laser light may be found by dividing the radiant fluence exposure, H, by the exposure duration, t:

$E$=(Energy/Area)/(Time)=$H/t$

For a radiant fluence exposure (H) of 0.637 mJ/cm$^2$ for 0.25 s, the irradiance (E) is:

MPE=[0.63 mJ/cm$^2$]/[0.25 s]=2.5(mW/cm$^2$)

Given this irradiance value, we can use Table 2 to identify the corresponding visual effect. In the example above, the irradiance (P/A=0.5 mW/π(0.35)$^2$=1.3 mW/cm$^2$) value is below the MPE threshold of 2.5×10$^{-3}$ W/cm$^2$. When taking this into account, using 1.3×10$^{-3}$ W/cm$^2$ of irradiance would meet the current ANSI standard.

Other relevant parameters are defined below:

Nominal Ocular Hazard Distance (NOHD): The distance along the axis of unobstructed beam from a laser to the human eye beyond which the irradiance is not expected to exceed the applicable MPE, as defined in ANSI-Z136.1.

Eye injury Distance (ED50) (D1): The location along a beam path where the exposure at 10 times the MPE is at 31.6% of the NOHD. There we have 50/50 chance of causing retinal damage.

Sensitive Zone Exposure Distance (SZED)(D2)—The beam is bright enough to cause temporary vision impairment (flash blindness), from the source to this distance.

Critical Zone Exposure Distance (CZED)(D3)—The beam is bright enough to cause a distraction interfering with critical task performance, from the source to this distance (Glare).

"Laser-Free" Exposure Distance (LFED)—Beyond this distance, the beam is dim enough that it is not expected to cause a distraction.

Although ANSI MPE parameters have been used as an example above, other groups that have also standardized the performance and safety of manufactured laser products may be used in addition to or as a substitution to the regulations listed above. Further, the system measures may be adjusted, at any time, to account for regulatory changes made to any of the standards available Environmental Factors One of the environmental factors to consider is the divergence of the beam relative to the distance to the targeted region and desired beam spot size at the targeted area. For the small hand-held devices, the beam diameter remains smaller than the separation of eyes for short distance and in some embodiments, it is advantageous to provide a beam divergence capability. Therefore, in some embodiments, it is desirable to have the ability to vary the divergence (zoom the illuminator) of the beam depending on the location of the device relative to the location, length, width, size or shape of the targeted area, etc. In other embodiments, the device can be made to accommodate for the divergence of the beams.

Figure 2:
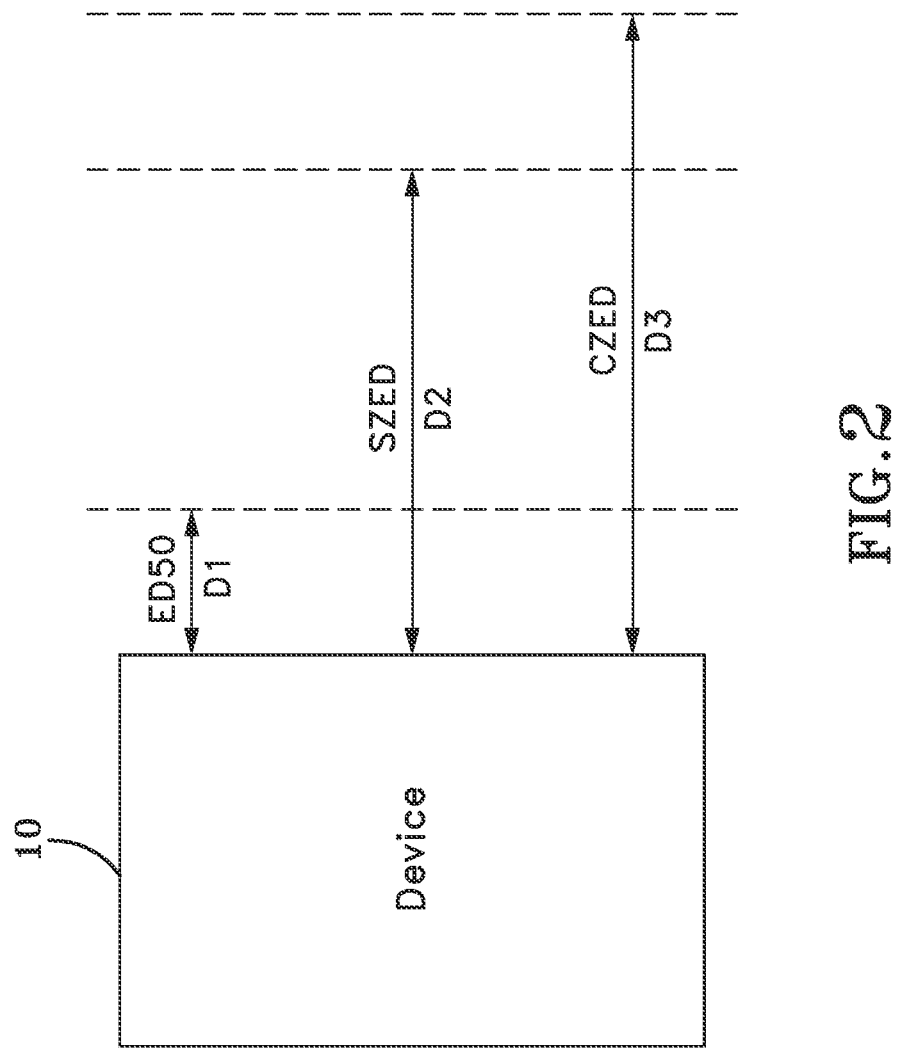
FIG. 2 is a schematic drawing of an example of an eye-impairment zone created by the device.

The presence of eyeglasses, dark glasses, goggles, or other eyewear, and filters may block the intense light beams to propagate through the eye. The device as designed here includes a plurality (two or more) intense light beams that can be modulated in space and/or time. In addition, the different wavelengths of the intense light beams make it more difficult to block out any particular wavelength. For example, in the embodiment as shown in FIG. 2, the blue laser operates in the 400-500 nm range; the green laser is operative to generate light at a wavelength of 500 nm to 580 nm, the infrared laser is operative to generate light at a wavelength of 700 nm to 1500 nm, and the red laser is operative to generate light at a wavelength of 580 nm to 700 nm. In this manner, if the intruder attempts to counter the visual impairment effect by using dark glasses, such dark glasses will have to be broadband or neutral density, which inevitably reduces the ability of the intruder to visualize his surroundings, especially in low light conditions.

Another environmental factor is the ambient light conditions. It is well known that the effect of intense light visual impairment is enhanced when ambient light is low. In addition, low light conditions cause pupillary dilation, allowing more light to enter the eye. There is also increased readaptation time (about 20 minutes) so the effects of afterimage will have more impact. Therefore, in some embodiments, the device can be synched with a module that controls ambient lighting (e.g. the lighting inside a building, the corridors, hallways, classrooms, etc.) and programmed so that when an intruder enters and the device is turned on, a controller simultaneously reduces ambient lighting by dimming or turning off lights, or by shading windows, etc., thus increasing the effectiveness of the visual impairment.

Although two environmental factors have been discussed, additional environmental factors (e.g., scatterers, reflectors, etc.) may also be considered.

Light Source Factors

Several light source factors can be altered to meet the desired parameters. The factors include, but are not limited to, the wavelength, variation, repetition frequency, intensity (irradiance and illuminance), and the pulse-to-cycle ratio.

Wavelength

The beams of intense light (light that can induce visual impairment) used in the device can have any wavelength in the visible range (400-700 nm), the near infrared range (700-1500) and the ultraviolet range (310-400 nm). The choice of which intense light wavelength to use will depend on a number of factors such as effectiveness in causing visual impairment, size, weight, power, amenability to temporal modulation, and beam quality (brightness). The term "peak wavelength" means the wavelength in the emitted light which carries the most irradiance.

It is known that different wavelengths of intense light have different effects on the eye and influence the effectiveness of visual impairment in various environments. For example, the optimal sensitivity of the eye during daytime (photopic vision using cones) is at 555 nm (green), and at night (scotopic vision with rods), is at 505 nm. (blue-green). At shorter wavelengths—towards the blue end of the spectrum (350-450 nm)—absorbance by the lens causes fluorescence which in turn produces intraocular veiling glare (480-520 nm).

For example, green light, with peak wavelength range of 500-580 nm, can effectively disrupt visual tracking performance. Humans use the central part of their visual field (the fovea) in which cone vision dominates to accurately visually track targets. For the detection and visual tracking of small objects, the L and M-cones with peak sensitivity at 530 and 560 nm, respectively, are most important. This implies that for maximum interference with an operator's task, it is preferable to disable both the L and M cones. So in some examples, it is considered that a single wavelength of 545 nm (halfway in between 530 and 560 nm) would be optimally suited to achieve this goal and in some of the device, one or more of the light beams may be chosen to have this wavelength range. For example, studies embodiments conducted on military personnel suggest that a wavelength of around 545 nm is preferred for inducing flash blindness since it will simultaneously affect the L and M cones that are required for visual tracking.

Other factors can also affect the choice of wavelength. For example, there is a significant amount of fluorescence that occurs when objects are illuminated with ultraviolet light. When the goal is to achieve wavelength versatility, different wavelength light sources or lasers should be incorporated into the light source component. In FIG. 1, each intense light or laser source is operative to generate a wavelength range of light. A typical classification of various lasers is shown in Table 5. The values in Table 5 are taken from Table C1 in current ANSI Z136.1.

TABLE 5

Typical Laser Classification-CW Point Source Lasers

| Wavelength (nm) | Class 1 (W) | Class 2 (W) | Class 3** (W) | Class 4 (W) |
|---|---|---|---|---|
| 315-400 | ≤3.2 × 10 − 6 | None | >Class 1 but ≤0.5 | >0.5 |
| 441.6 | ≤4 × 10 − 5 | Class 1 but ≤1 × 10 − 3 | Class 2 but ≤0.5 | >0.5 |
| 488 | ≤2 × 10 − 4 | Class 1 but ≤1 × 10 − 3 | Class 2 but ≤0.5 | >0.5 |
| 514 | ≤4 × 10 − 4 | Class 1 but ≤1 × 10 − 3 | Class 2 but ≤0.5 | >0.5 |
| 532 | ≤4 × 10 − 4 | Class 1 but ≤1 × 10 − 3 | Class 2 but ≤0.5 | >0.5 |
| 632 | ≤4 × 10 − 4 | Class 1 but ≤1 × 10 − 3 | Class 2 but ≤0.5 | >0.5 |
| 670 | ≤4 × 10 − 4 | Class 1 but ≤1 × 10 − 3 | Class 2 but ≤0.5 | >0.5 |
| 780 | ≤5.6 × 10 − 4 | None | >Class 1 but ≤0.5 | >0.5 |

Variation

In some examples, the light beam can be made to have temporal variation in intensity or be pulsed to enhance its effectiveness. In one example, a unit composed of three (3) different wavelengths can pulse or produce a continuous-wave emission. The blue and red wavelengths may pulse while the green wavelength is a continuous-wave. The pulsed lasers may vary output at a rate between 7 Hz and 20 Hz. This can be done by varying the input current. In the same example, the continuous-wave laser (green laser) can be produced by a continuous-wave (CW) diode pumped $Nd^{3+}$ laser with an optical frequency doubler that converts the near-infrared light into the green wavelength. These doubled Nd lasers can be designed to operate continuously.

The intense light source can also be a bright light emitting diodes. These devices can produce very bright quasi directional beams of colored light centered at different wavelengths. Typically, they have a Full Width at Half Maximum-FWHM of less than 50 nm. This allows a semi-broadband emitter which can be used to glare a targeted area.

Repetition Frequency

In case a modulated intense light is used as one or more intense light beams, the frequency can be pre-determined or adjusted as necessary. In some embodiments, the modulation frequency is between 1 and 30 Hz and is used to create maximum discomfort. After 30 Hz, the eyes see it as being continuous. In some examples, the frequency can be 5, 10, 15, 20, 25 or 30 Hz.

Irradiance

Different intensity levels can produce different visual impairment effects. For example, for flash blindness, the irradiance of a flash required to obtain a certain recovery time depends on irradiance of the light source, background luminance (pupil size and initial adaptation state of the observer), and the ambient-background contrast. For flicker, the degree of discomfort depends on the modulation depth (difference between maximum and minimum light irradiance). Pulsed lasers may also be used to counter the blink reflex and may also cause additional startle and distraction.

The ANSI Z136.1 standard defines laser irradiance ($W/cm^2$) threshold exposure levels for visual interference. Examples of the laser irradiance threshold levels corresponding to the different visual interference effects are shown in Table 2.

The device may have a light source capable of producing a light beam having an irradiance 1/10th below MPE up to 2, 3, 4, 5, 6, 7, 8, 9, 10 times or more above the MPE for each light beam generated in a particular zone (D1, D2, D3 in FIG. 2). Thus, the irradiance of each light beam used may range from $nW/cm^2$ to $\mu W/cm^c$ to $mW/cm^2$ to several hundred $mW/cm^2$ to a few $W/cm^2$ depending on the characteristics of the spatial array.

Pulse-to-Cycle Ratio

The transitions from dark to bright (and vice versa) should be as fast and strong as possible to induce maximum discomfort.

Although the factors cited above are examples of the light source factors that were considered, it should be mentioned that there are several additional factors that drive the light source selections, including, but not limited to, visibility of the light (lumen), effectiveness in creating visual impairment, light wavelength, size and weight of the source, power input, amenability to temporal modulation, and beam quality (brightness).

Modulator Factors

The modulator component 18 can alter the temporal and/or spatial aspects of the intense light source 12 to create: (a) a spatial array of intense light projected onto a targeted area made by one or more beams of light being split into a plurality of beams to produce a pattern of discrete beams, and/or (b) a spatial array of intense light projected onto a targeted area made by one or more beams modulated temporally to produce a beam rastering/steering pattern.

Rastering (or steering) is the ability to scan a pattern from side to side and from top to bottom. Rastering can be accomplished mechanically and/or without a mechanical means. Mechanical steering can be achieved by several methods, including rotating mirrors driven by a stepper, galvanometer motors or mounted on gimbaled mechanisms driven by piezoelectric actuators or with rotating prisms or DOE, for example. Non-mechanical beam steering can be achieved through means such as acousto-optic deflection, electro-optic deflection and the use of spatial light modulators, for instance. In some embodiments, a reflective light valve (a set of mirrors, for example) is used to create the rastering pattern, Rastering can be applied to each of the beams of intense light.

In some embodiments of the device, a combiner can be used to mix two or more beams of light with two or more different wavelengths. Accordingly, for example, the combiner can combine two or more wavelengths to colinearly propagate, so a single raster can then produce a temporal pattern of all said combined wavelengths simultaneously. One advantage of such a system, for example, is that the intruder will see a single color that may be composed of several wavelengths, therefore making it harder to protect against all the wavelengths.

In some embodiments, beam modulation can be achieved but not limited by the addition of a mechanical and/or an optical component to each beam such that the output beam direction and/or irradiance is variable in space and/or time. Such a spatial array increases the effectiveness of the device in producing visual impairment, e.g., because the intruder will not be able to easily move to a spot where the light will not affect his/her vision.

For example, one type of modulation can be achieved by: first, using a beam splitter which functions to create multiple beams (two or more) from the same beam and a projector which projects the beams into a space in a specific direction as a function of time. For instance, a beam splitter such as a prism or diffractive optical element (DOE) may be used that can split each beam of light into multiple (two or more) beams. A beam steering element can be used to alter the exposure to a beam at a particular location on the target. In some embodiments, the modulator is a single system performing both splitting and directing of the beams. In other is embodiments, the role of splitter and projector are separated. In some embodiments, the projector 20 may use various lenses or other means for varying the divergence or spatial relationship of the beams depending on the size, shape and environmental factors affecting the area to be illuminated. In some embodiments, a reflective light valve and/or a refractive light valve may be used to modulate the beams.

In some embodiments, the controller 24 or alternatively, projector 20 includes an intelligent control device for automatically controlling the pulse duration and power for individual wavelength of light.

Pre-Set or Adjustable Controls

In some embodiments, the device may be furnished with one or more pre-set controls, each with a pre-set set of parameters for the light source, type and intensity of beams, projection and spatial array settings, etc. For example, the device can have just one on-/off button to turn it on or off. Alternatively, it can have various pre-set settings each of which can be turned on or off. In some embodiments, various parameters can be controlled, either manually, automatically, remotely, or a combination of these. For example, the output power, wavelength, beam spread, beam pattern, pulse frequency/width/duration (in case of pulsed lasers) for any beam of intense light may be adjustable according to the distance or size and characteristics of the targeted area to ensure the light is effective in causing visual impairment.

In some embodiments, a control means (e.g. remotely activated control or mechanically accessible switch, etc.) may be used to vary various parameters of the device, e.g. the power levels of the light beams. For example, depending on lighting conditions, the power of a red or violet beam can be changed from 4 mW to 480 mW and 0.5 mW to 500 mW, respectively. A green beam (e.g. green laser) can be adjustable from less than 1 mW to 1400 mW or higher. Similarly, an infra-red laser beam can be adjusted to have a power of from less than 1 mW to greater than 2000 mW. Other color light beams may be adjusted as necessary.

However, it must be noted that these numbers may be higher up to the allowable max power, e.g. up to several watts.

If a pulsed laser is used, the pulse duration of the laser (e.g. red, green, blue, violet, etc.) can be controlled by a controller.

The values of the powers and the pulse durations cover a range of operation of the intense light or laser and the anticipated range of operation for the visual impairment effect (e.g. D1, D2 and D3 in FIG. 2). In addition to manual operation, the above parameters can also be controlled remotely, or automatically controlled by an active sensor system.

Flicker—in some embodiments, the beam of intense light may flicker defined as light that varies rapidly in brightness. Flicker as used herein includes both "luminance" (luminous intensity per unit area) flicker and "chromatic" flicker.

Studies on the visual effects due to dynamic changes in light level reveal that flickering lights within the frequency range 2-25 Hz are perceived as disturbing. At 10 Hz the subjective brightness of flickering lights is at maximum, known as the Brucke-Bartley effect. The rate of discomfort depends on the modulation depth and the intensity time profile of the flicker. The modulation depth is defined as the difference between the maximum and minimum light level. The shape of the intensity profile with time also determines effectiveness of the flicker: short flashes in which the duration of the ON-cycle is less than 25% of the total ON-OFF cycle (the so called pulse-to-cycle ratio) are visually most effective. Perceived discomfort also depends on the size of the light source: the larger the visual angle of the light source in the visual field, the more discomfort is experienced. This is typically expected when the intensity (irradiance) of the light source is kept constant. When keeping retinal illuminance (i.e., the amount of light falling upon the eye) fixed, the discomfort increases with decreasing light source area.

Luminance flicker (temporal intensity modulations of bright lights) can trigger additional adverse physiological and psychological symptoms, ranging from vertigo, disorientation, mild headaches and muscle spasm to convulsions or epileptic seizures. These effects increase with the intensity of the source and are usually stronger when the light is spatially scanning through a pattern. Bright and flickering light sources that cover the majority of the visual field are most effective in disrupting the normal brain activity.

Chromatic flicker (temporal chromaticity modulations of bright lights) can trigger sustained cortical excitation and/or discomfort even in normal subjects, which is largest at a driving frequency of 10 Hz, and strongest for Red/Blue flicker, followed by Blue/Green and Red/Green. Red-blue flicker is most provocative below 30 Hz. Given the above, in some examples, the device may include a flicker or strobing effect, either with regard to the beams of intense light being projected, or in addition to those.

Eye Protection

The various parameters (wavelength, intensity, etc.) of the light may be adjustable in order to adapt to the fact that the intruder may be wearing eye protection. ANSI Z136.1 provides the parameters and correction factors in Table 6 (reproduced below). Table 7 (reproduced from current ANSI Z136.1) sets forth visual correction factors (VCF) for visible lasers.

The term "Visually Corrected Power" used in this document is the same as "effective irradiance." The Visual Correction Factor used in this table (CF) is the CIE normalized efficiency photopic visual function curve for a standard observer.

TABLE 6

Parameters and Correction Factors

| Parameters/ Correction Factors | Wavelength (μm) | Figure with Graphical Representation |
|---|---|---|
| $C_A = 1.0$ | 0.400 to 0.700 | 8a |
| $C_A = 10^{2(\lambda-0.700)}$ | 0.700 to 1.050 | 8a |
| $C_A = 5.0$ | 1.050 to 1.400 | 8a |
| $C_B = 1.0$ | 0.400 to 0.450 | 8c |
| $C_B = 10^{20(\lambda-0.450)}$ | 0.450 to 0.600 | 8c |
| $C_C = 1.0$ | 1.050 to 1.150 | 8b |
| $C_C = 10^{18(\lambda-1.150)}$ | 1.150 to 1.200 | 8b |
| $C_C = 8$ | 1.200 to 1.400 | 8b |
| $C_E = 1.0 \; \alpha < \alpha_{min}$* | 0.400 to 1.400 | — |
| $C_E = \alpha/\alpha_{min} \; \alpha_{min} \leq \alpha \leq \alpha_{max}$* | 0.400 to 1.400 | — |
| $C_E = \alpha^2/(\alpha_{max} \alpha_{min}) \; \alpha > \alpha_{max}$* | 0.400 to 1.400 | — |
| $C_P = n^{-0.25}$** | 0.180 to 1000 | 13 |
| $T_1 = 10 \times 10^{20(\lambda-0.450)}$*** | 0.450 to 0.500 | 9a |
| $T_2 = 10 \times 10^{(\alpha-1.5)/98.5}$**** | 0.400 to 1.400 | 9b |

*For wavelengths between 0.400 and 1.400 μm; $\alpha_{min}$ = 1.5 mrad and $\alpha_{max}$ = 100 mrad
**See 8.2.3 for discussion of $C_P$ and 8.2.3.2 for discussion of pulse repetition frequencies below 55 kHz (0.4 to 1.05 μm) and below 20 kHz (1.05 to 1.4 μm).
***$T_1$ = 10 s for λ = 0.450 μm, and $T_1$ = 100 s for λ = 0.500 μm.
****$T_2$ = 10 s for α < 1.5 mrad, and $T_2$ = 100 s for α > 100 mrad.
Note 1:
Wavelengths must be expressed in micrometers and angles in milliradians for calculations.
Note 2:
The wavelength region $\lambda_1$ to $\lambda_2$ means $\lambda_1 \leq \lambda < \lambda_2$, e.g. 0.550 to 0.700 μm means 0.550 ≤ λ < 0.700 μm.

TABLE 7

VISUAL: CORRECTION FACTOR FOR VISIBLE LASERS
Use for visible lasers only (400-700 nm).

| Laser Wavelength (nm) | Visual Correction Factor (VCF) | |
|---|---|---|
| 400 | $4.0 \times 10^{-4}$ | (VCF = 1) |
| 410 | $1.2 \times 10^{-3}$ | |
| 420 | $4.0 \times 10^{-3}$ | |
| 430 | $1.16 \times 10^{-2}$ | |
| 440 | $2.30 \times 10^{-2}$ | |
| 450 | $3.80 \times 10^{-2}$ | |
| 460 | $5.99 \times 10^{-2}$ | |
| 470 | $9.09 \times 10^{-2}$ | |
| 480 | $1.391 \times 10^{-1}$ | |
| 490 | $2.079 \times 10^{-1}$ | |
| 500 | $3.226 \times 10^{-1}$ | |
| 510 | $5.025 \times 10^{-1}$ | |
| 520 | $7.092 \times 10^{-1}$ | |
| 530 | $8.261 \times 10^{-1}$ | |
| 540 | $9.524 \times 10^{-1}$ | |
| 550 | $9.901 \times 10^{-1}$ | |
| 555 | $1.0 \times 10^{8}$ | |
| 560 | $9.901 \times 10^{-1}$ | |
| 570 | $9.524 \times 10^{-1}$ | |
| 580 | $8.696 \times 10^{-1}$ | |
| 590 | $7.576 \times 10^{-1}$ | |
| 600 | $6.329 \times 10^{-1}$ | |
| 610 | $5.025 \times 10^{-1}$ | |
| 620 | $3.817 \times 10^{-1}$ | |

TABLE 7-continued

VISUAL: CORRECTION FACTOR FOR VISIBLE LASERS
Use for visible lasers only (400-700 nm).

| Laser Wavelength (nm) | Visual Correction Factor (VCF) |
|---|---|
| 630 | $2.653 \times 10^{-1}$ |
| 640 | $1.751 \times 10^{-1}$ |
| 650 | $1.070 \times 10^{-1}$ |
| 660 | $6.10 \times 10^{-2}$ |
| 670 | $3.21 \times 10^{-2}$ |
| 680 | $1.70 \times 10^{-2}$ |
| 690 | $8.2 \times 10^{-3}$ |
| 700 | $4.1 \times 10^{-3}$ |

Translating the ANSI parameters, in such cases, the MPE thresholds change are shown below in tables 8-9. (Note, Table 8 shows the threshold levels for an unprotected eye).

TABLE 8

Broadband Irradiance threshold exposure levels
(protected eye; medium to dark shade).

| Visual Effect | Irradiance Threshold (W/cm2) |
|---|---|
| MPE | $31.0 \times 10 - 3$ |
| Afterimages, flash blindness | $12.5 \times 10 - 4$ |
| Glare | $62.5 \times 10 - 6$ |
| Startle, distraction | $62.5 \times 10 - 8$ |

TABLE 9

Broadband illuminance threshold exposure levels
(protected eye; light shade).

| Visual Effect | Irradiance Threshold (W/cm2) |
|---|---|
| MPE | $6.3 \times 10 - 3$ |
| Afterimages, flash blindness | $2.5 \times 10 - 4$ |
| Glare | $12.5 \times 10 - 6$ |
| Startle, distraction | $12.5 \times 10 - 8$ |

Some examples of the device and its operation are presented below.

EXAMPLE 1

Figure 3B:
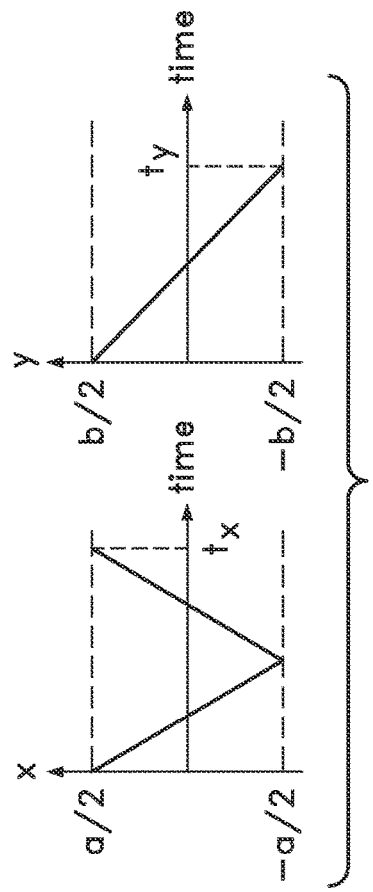
FIG. 3B is a graph representing an array pattern used in the device of FIG. 3A.
Figure 3A:
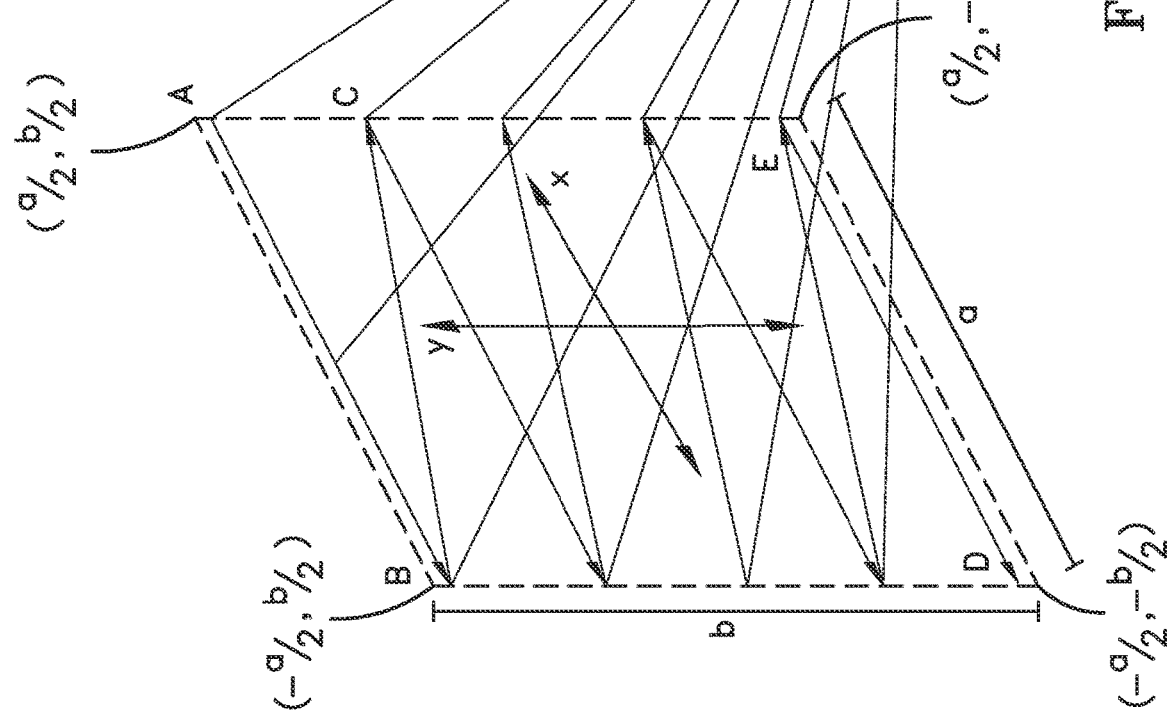
FIG. 3A is a schematic drawing of an example of the device described in Example 1.

One example of the device, shown in FIGS. 3A and 3B, has the following features: a) $Beam_1$: CW monochromatic light source at λ1; b) $Beam_{2,3}$: Double CW monochromatic light source at λ2 and λ3; c) $Beam_4$: Broad-band CW/pulsed visible light source; and d) Modulator: Beam steering system and integrated optics This system includes a $Beam_1$ (a single light source) with red emission and $Beam_{2,3}$ (a double light source) with green and NIR emissions. In addition, the system also includes $Beam_4$ (the broad band CW/pulsed light source) that, when included in the system, causes the source to transition from a dazzling (discomfort glare) source to a disability (glare, flash blindness) source (e.g. using the CW Lasers systems).

FIG. 3A shows a Beam 102 (where i=1, 2, 3, 4, . . . n). $Beam_i$ 102 may represent any of the beams above ($Beam_1$, $Beam_{2,3}$, $Beam_4$, etc.). FIG. 3A shows the coordinates of the array associated with Beam 102 when the beam is projected onto the No-Go zone 104, for example the entrance to a building, an internal corridor, a doorway of a security van, etc. Each beam has a wavelength $\lambda_i$ (where i=1, 2, 3, 4 . . . n) between 380-1550 nm.

In this example, initial coordinates of Beam (represented by point A) are (a/2, b/2). As this point moves in the direction of the arrows, the point begins to oscillate as it transitions from (a/2, b/2) to (−a/2, b/2) and then from (−a/2, b/2) to (a/2, b/2−$L_n$), where $t_x$ is the time that it takes to travel from point A to point B. The point continues to oscillate until it arrives at point C. The time period required to travel from point A to point C is $t_y$.

Now referring to FIG. 3B, we see that the "x-axis" and "y-axis" graphs correspond to what has been described above. Beam 102 (where i=1, 2, 3, 4 . . . n) oscillates back and forth along the x-axis from (a/2) to (−a/2) and from (−a/2) back to (a/2) over time period $t_x$. In a similar manner, the "y-axis" graph corresponds to what is described above, i.e. the same Beam$_i$ 102 (where i=1, 2, 3, 4 . . . n) oscillates back and forth along the y-axis from (b/2) to (−b/2) and then from (−b/2) back to (b/2). This occurs over a time period ($2t_y$) and it takes a time period of $t_y$ to travel from (b/2) to (−b/2) and an additional time period of $t_y$ to travel from (−b/2) back to (b/2).

In this example, the described model applies to Beam 102 (where i=1, 2, 3, 4, . . . n). However, the coordinates and oscillation time intervals for each beam may vary or may be the same. In addition, the system can have a combination of dynamic patterns (as shown) and static patterns, or any combination of spatial arrays, as required.

EXAMPLE 2

Another example of the contemplated device produces a pattern shown in FIG. 4. In this device, Beam$_1$ is a CW triple laser light source at $\lambda_1$, $\lambda_2$ and $\lambda_3$. The modulator includes a Diffractive Optical Element (DOE).

This system includes Beam$_1$ with blue ($\lambda_1$ 150), green ($\lambda_2$ 152) and red ($\lambda_3$ 154) emissions, where $\lambda_1$ 150<$\lambda_2$ 152<$\lambda_3$ 154. Beam$_1$ may optionally include a broad band CW/Pulsed light source as well. If the broad band CW/Pulsed light source is added to the source, the system transition from a dazzling (discomfort glare) source to a disability (glare, flash blindness) source (e.g. using the CW Lasers systems). When a modulator that includes the DOE is used, a pattern that shows a distribution in space of several wavelengths is generated. Note, this pattern can be static or dynamic. In this example, the irradiance at the entrance of the No-Go zone is ≤6×10$^{-4}$ W/cm$^2$.

EXAMPLE 3

Figure 5:
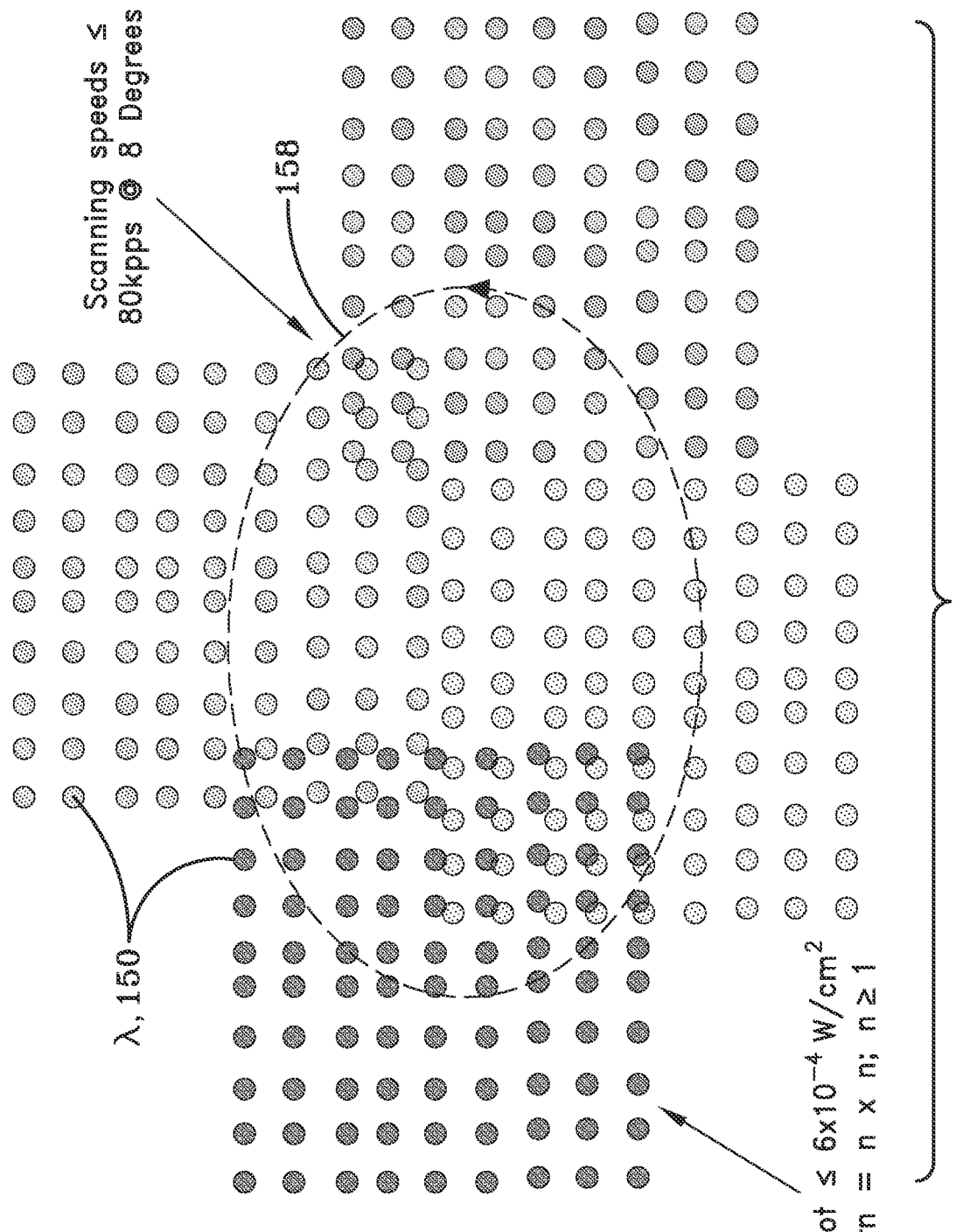
FIG. 5 is a schematic drawing of another example of different spatial array patterns for lights having different wavelengths.

Another example of the contemplated device produces a pattern shown in FIG. 5 (for only one beam 150). This system includes a CW dual laser light source at $\lambda_1$ and $\lambda_2$ (so Beam$_1$ includes two wavelengths $\lambda_1$ 150 and $\lambda_2$. In this example, the source Beam$_1$ includes green and infrared emissions, corresponding to $\lambda_1$ 150 and $\lambda_2$ (not shown) respectfully. If the broad band CW/Pulsed light source is added to the source, the system transition from a dazzling (discomfort glare) source to a disability (glare, flash blindness) source (e.g. using the CW Lasers systems). When a modulator that includes a DOE is used, a pattern that shows the distribution in space of a couple of wavelengths is generated. Beam$_1$ also includes a reflective light valve (beam steering/raster system) that dynamically moves the light pattern in an oval motion 158.

EXAMPLE 4

Figure 6:
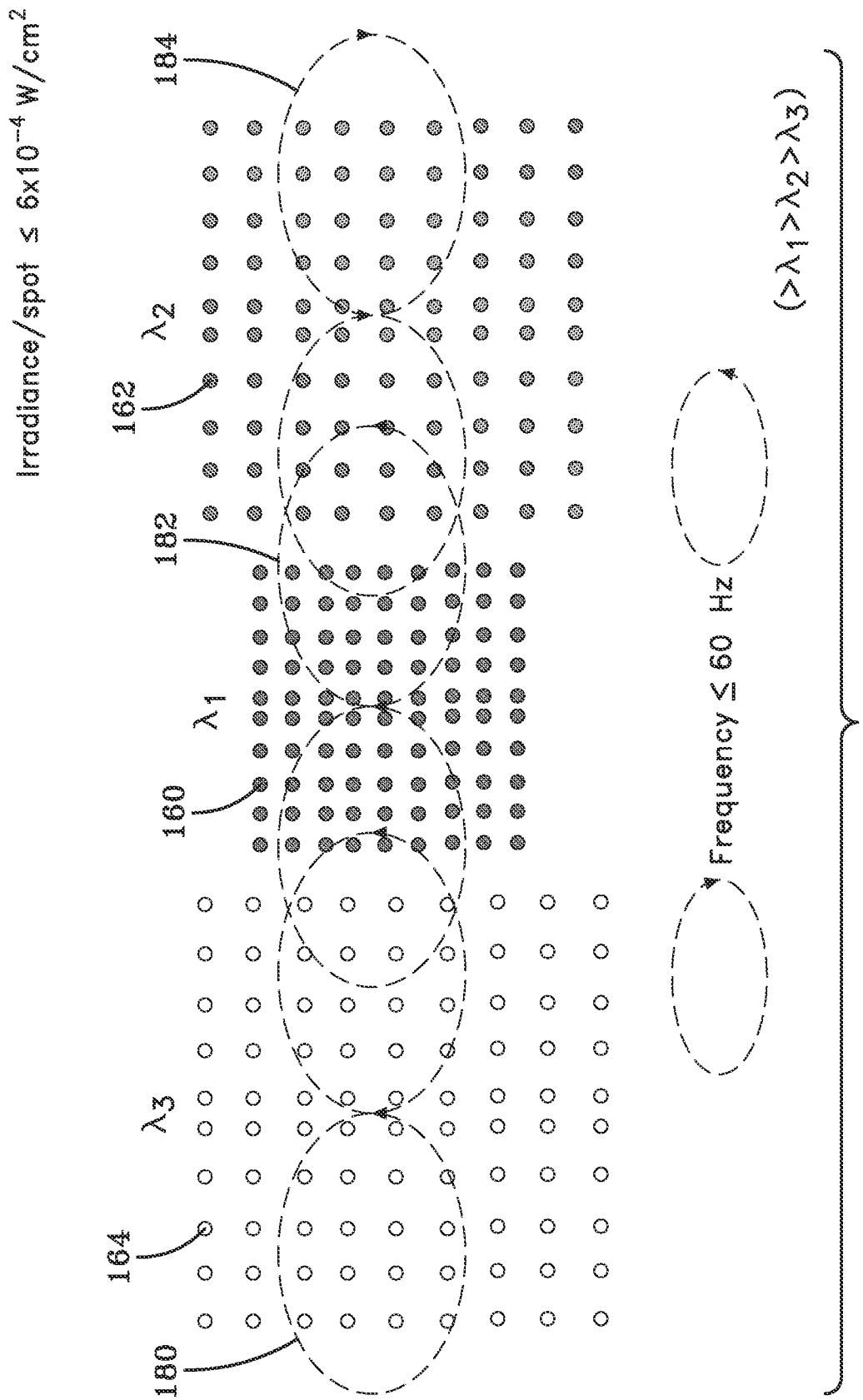
FIG. 6 is a schematic drawing of another example of different spatial array patterns for lights having different wavelengths.

Another example of the contemplated device produces a pattern shown in FIG. 6. This example includes:
Beam$_1$: CW monochromatic light source at $\lambda$1;
Beam$_{2,3}$: Double CW monochromatic light source at $\lambda$2 and $\lambda$3;
Beam$_4$: Broad band CW/pulsed visible light source;
Modulator: Diffractive Optical Element (DOE), Beam steering system of laser light at $\lambda_1$<$\lambda_2$<$\lambda_3$, and integrated optics.

In one example, Beam$_1$ has a blue emission (wavelength $\lambda_1$) and Beam$_{2,3}$ has green (wavelengths $\lambda_2$) and red emissions (wavelength $\lambda_3$), Accordingly, $\lambda_1$<$\lambda_2$<$\lambda_3$. With the addition of a broad band CW/Pulsed light source, the system can transition from a dazzling (discomfort glare) source to a disability (glare, flash blindness) source (e.g. using the CW Lasers systems). The modulator, which includes the DOE, can produce patterns 160, 162, 164 (the patterns show the generated distribution in space of the three wavelengths $\lambda_1$, $\lambda_2$, $\lambda_3$). When the reflective light valve (beam steering/raster system) is added to the system, each pattern (160, 162, 164) can dynamically move the pattern in an eight-figure motion as seen in (180, 182, 184), respectively. Note that the patterns of motion 180, 182, 184 may be the same or different from each other.

Disrupted Binocular Vision

As mentioned, the systems and methods described above may optionally be used to disrupt binocular vision. In some embodiments, methods of disrupting binocular vision may be used alone or in combination with other visual impairment methods described above.

Figure 7A:
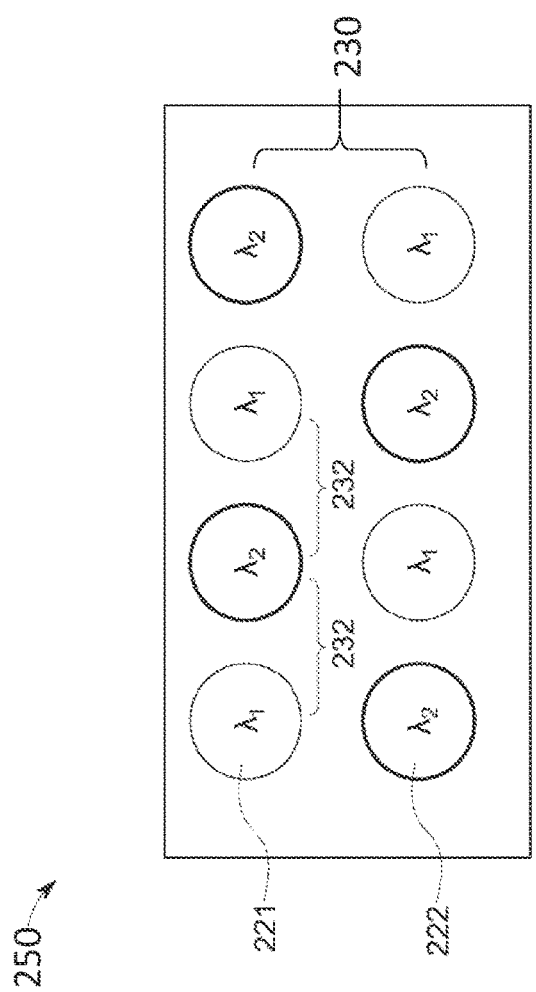
FIG. 7A is a schematic drawing of a spatial array of light beams in a matrix form at a theoretical plane within the visual impairment zone according to some embodiments of the present disclosure.

FIG. 7A shows a spatial array 250 of light beams in a matrix form at a theoretical plane within the visual impairment zone. The light beams are characterized by an array of first matrix elements 221 having a first color $\lambda_1$ and an array of second matrix elements 222 having a second color $\lambda_2$. For example, the first color may be red and the second color may be blue, but many other color combinations may be used. In this embodiment, the matrix elements are laterally spaced by a distance 232 and vertically spaced by a distance 230. Although shown as symmetrical in FIG. 7A, the arrays of first and second matrix elements may be skewed in relative position where distance 232 and/or distance 230 varies across the plane. Further, distance 232 and/or distance 230 may vary as a function of plane position, i.e., distance from the visual impairment device. Rather than spots, the matrix elements may be other shapes, for example, lines, geometric shapes, circles, vertical stripes, etc. Spatial array 250 may be formed using a visual impairment device as described above.

Figure 7B:
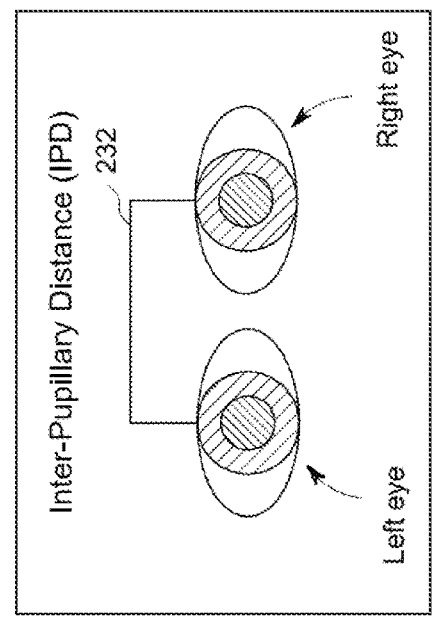
FIG. 7B is a schematic drawing of the interpupillary distance between two eyes.
Figure 8:
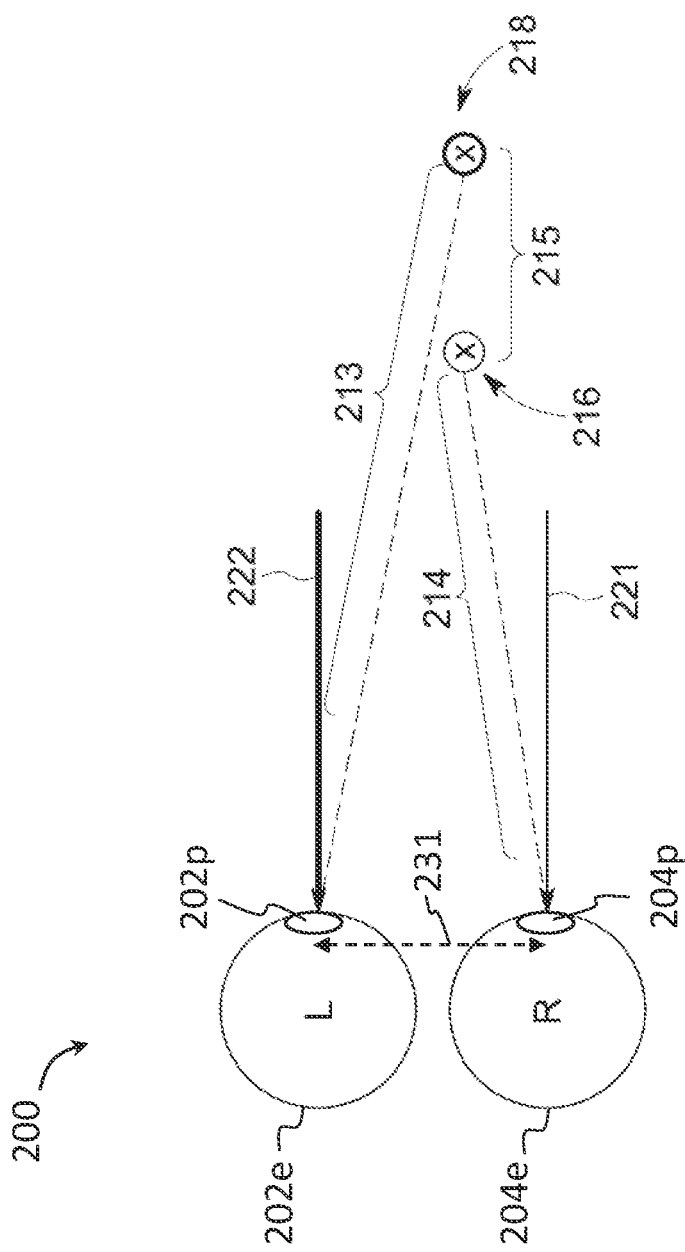
FIG. 8 is a schematic drawing illustrating how directing differently colored light beams into each eye may affect depth perception according to some embodiments of the present disclosure.

In some embodiments the lateral distance 232 between the different color light beams or matrix elements is designed to approximate the pupil-to-pupil distance of an intruder (FIG. 7B) so that the first color light enters one eye (e.g., the right eye) and the second color light enters the other eye (e.g., the left eye) in order to achieve a disrupted binocular effect. As mentioned, simply receiving different color light into each eye can be visually disruptive. In some embodiments, the light beams enter the left and right eyes concurrently. In some cases, the light beams enter the left and right eyes sequentially. In some embodiments, one light beam enters one eye within about 0.25 seconds of the other light beam entering the other eye (the approximate time it takes for an average person to blink). In some cases, as shown in FIG. 8, a person may further experience disorientation caused by a distortion in depth perception. A subject 200 in the visual impairment zone has left eye 202e including pupil 202p and right eye 204e including pupil 204p. The pupils of the left and right eyes are separated by an inter-pupillary distance 231. In one or more areas within the visual impairment zone, the inter-pupillary distance 231 is approximately equal to the lateral spacing 232 of the first and second matrix elements. In such case and at an appropriate height above the floor, a first light beam having a first color corresponding to matrix element 221 enters the right eye, and a second light beam having a second color corresponding to matrix element 222 enters the left eye. In some embodiments, the visual system interprets the first light beam as having an origin at first point 216 with an apparent first depth of 214, and interprets the second light beam as having an origin at second point 218 with an apparent second depth 213 longer than the first depth. The difference in the apparent depths, i.e. the distance between 216 and 218 (215) results in a binocular optical distortion because the brain has to process two different apparent focus points. This results in a binocular vision disruption and disorientation. The larger the relative discrepancy or distance (215) between 216 and 218, the more the distortion.

Figure 9:
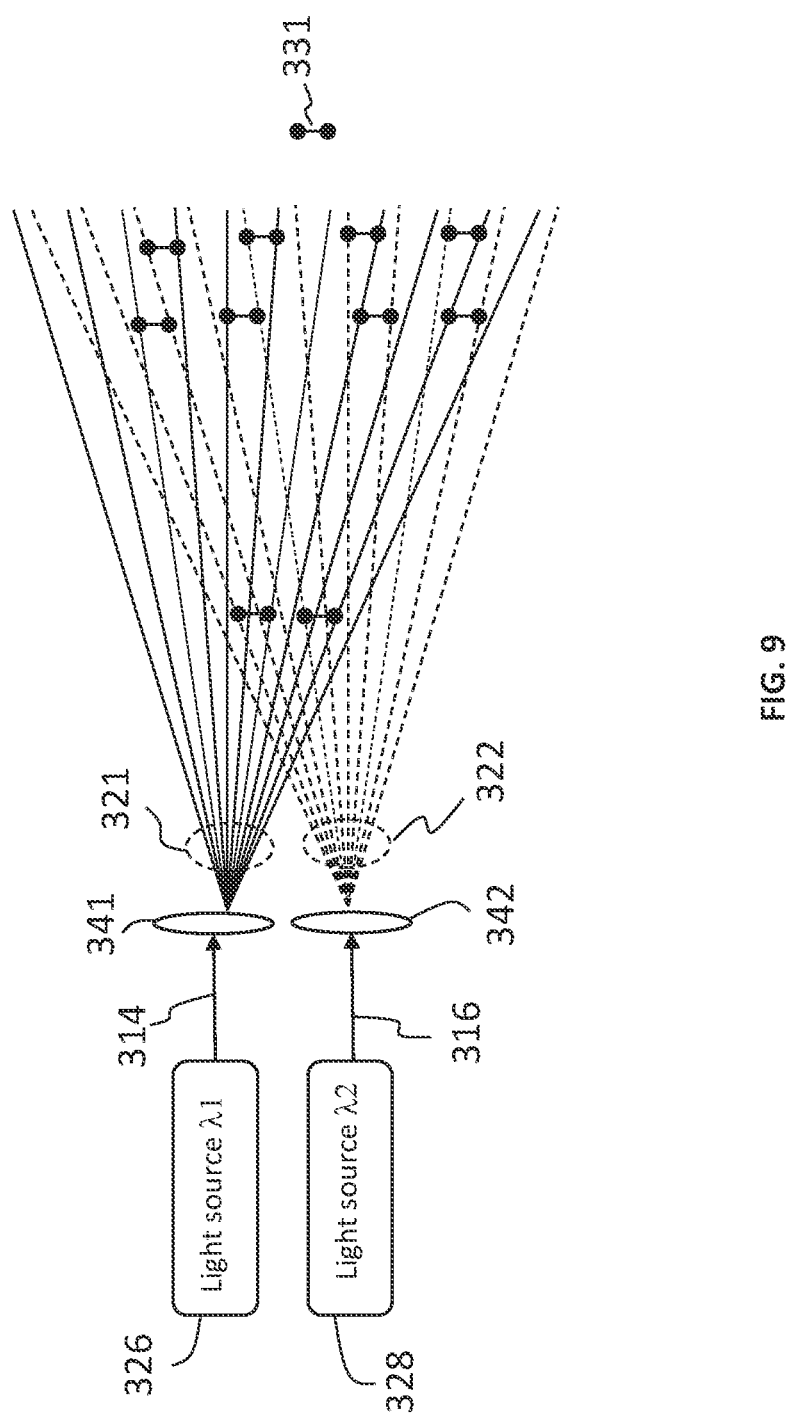
FIG. 9 is a schematic drawing showing how spatial arrays of light may be formed so that their spacing may match an inter-pupillary distance of a person in a visual impairment zone according to some embodiments of the present disclosure.

Of course, there exists a range of inter-pupillary distances 231 among the population in addition to variations in height. In order to accommodate for such variation without using tracking devices, the visual impairment zone may include a large number of beams at various angles and intersection points to form a large number of binocular impairment zones within the visual impairment zone. For example, FIG. 9 illustrates another embodiment showing a portion of the visual impairment device including a first light source 326 producing a first intense light 314 having a first peak wavelength $\lambda_1$, and a second light source 328 producing a second intense light 316 having a second peak wavelength $\lambda_2$ different from the first. The first intense light 314 is passed through a first DOE 341 to form a first spatial array 321 (solid lines) similar to any of those previously described. Similarly, the second intense light is passed second intense light 316 is passed through a second DOE 342 to form a second spatial array 322 (dashed lines) similar to any of those previously described. It is contemplated that when an intruder enters the visual impairment zone, the spacing between the individual light beams or matrix elements of array 321 and array 322 will be about equal to an intruder's inter-pupillary distance 331. For clarity, only a few such locations are shown. Typically, the inter-pupillary distance for a person less than about 110 mm and greater than about 40 mm. In some embodiments, the visual impairment device can produce multiple areas within the visual impairment zone where the lateral distance between a light beam of the first spatial array and a light beam of the second spatial array is in a range of 40 to 110 mm, alternatively 50 to 100 mm. In some embodiments, the spatial array may produce vertical lines of light or other geometric shapes (rather than spots) to reduce or eliminate a person's height from avoiding a binocular impairment area.

In some examples, one DOE can be used to produce a different pattern for the two wavelengths of light ($\lambda_1$ and $\lambda_2$) such that the different wavelengths spots are separated, as shown in FIG. 7A. This can occur because DOEs are typically optimized for one wavelength of light, so if a different wavelength of light goes through the same DOE a different pattern will emerge where the two colored spots are separated.

A proper design can be obtained where a subject cannot easily avoid at least some of these binocular impairment areas. To further improve the likelihood of a subject receiving a binocular visual disturbance, one or both arrays may move as previously described. In some embodiments one or both DOEs may rotate to cause constantly varying spacing between differently colored light beams, both positionally and temporally. For example, the whole pattern containing the two or more wavelengths can move as a whole, or the device can move one pattern of a first wavelength $\lambda_1$ in one motion path and the other wavelength $\lambda_2$ along a different path, causing a combination of movements, which are predicted to cause increased visual disturbance. Note that the visual impairment devices described earlier may also achieve the same or similar array of light beams shown in FIG. 9 and optionally utilize a rotating DOE to provide varying spacing for binocular visual disturbance or for some other visual disturbance purpose.

Referring again to FIG. 8, the visual impairment device may produce an alternating color strobing effect where the wavelengths of the matrix elements 221 and 222 switch back and forth. The light to each eye switches wavelengths from one color (e.g. red) to another color (e.g. blue), so the same eye is exposed to different wavelengths of light in succession separated by a pre-defined color-switching duration. In some embodiments, the duration may be less than 30 Hz. This will compound the confusion in depth perception and increases binocular visual disruption.

Figure 10:
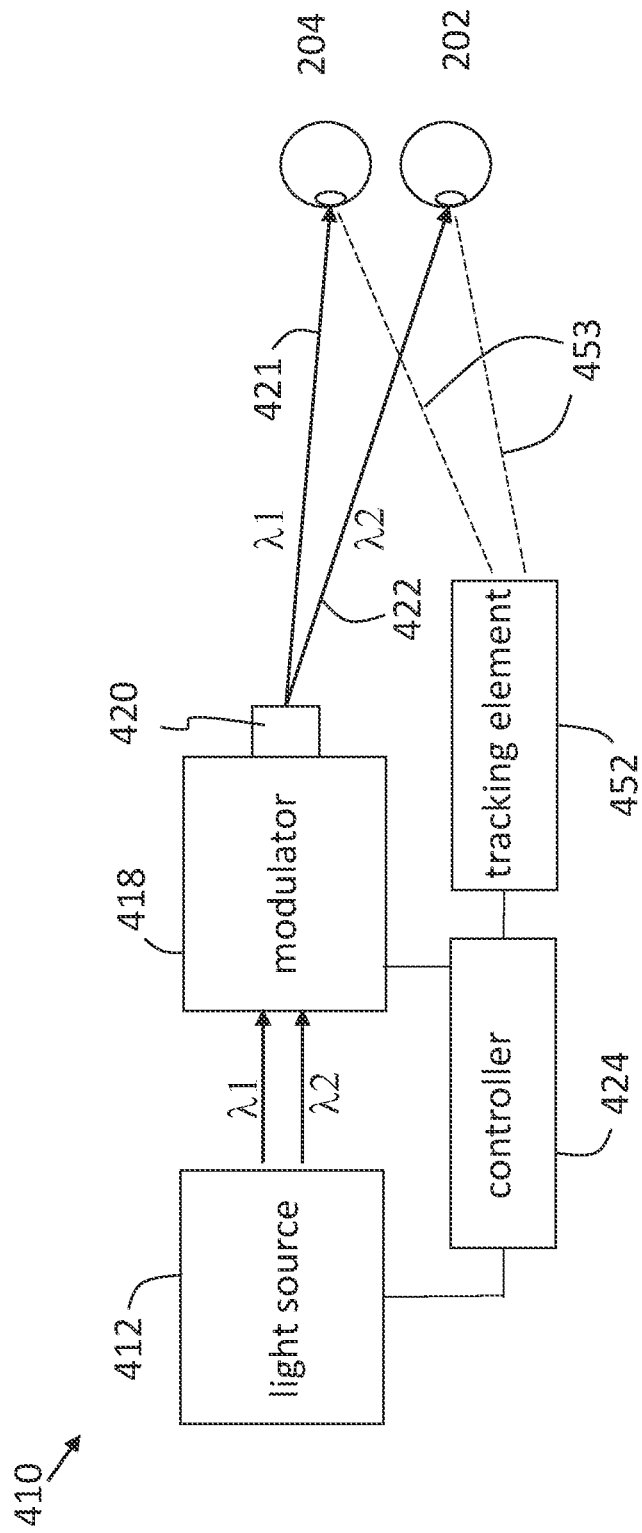
FIG. 10 is a schematic of a visual impairment device according to some embodiments of the present disclosure.

FIG. 10 shows another example of the contemplated device 410 that includes a tracking element 452 along with previously described elements including light source 412 capable of providing multiple wavelengths of light ($\lambda_1$ and $\lambda_2$), modulator 418, projector 420, and controller 424. The tracking element is part of, or in communication with, the visual impairment device 410 via the controller 424 to generally track a potential intruder and follow as he or she moves within the visual impairment. The tracking element 452 may include a motion detector, a video camera, infrared sensors, a wireless sensor array, or any number of known technologies (e.g. facial or object recognition, or other analytics) to determine the location of a person within an area. In some embodiments, a motion detector may be used to trigger the system to turn on, while another tracking technology is used for tracking the person.

In some embodiments, the tracking element 452 may emit a tracking detection light which may be a flash or directed beam. Reflected light 453 from the subject's eyes 202, 204, is detected by the tracking element 452 to range and identify a viewer's eye position and distance. This information may be processed by the device, e.g., at the controller, to determine how to alter the light source, modulator, and/or projector so as to redirect differently colored light beams 421, 422 towards the target's eyes. The tracking element may monitor the movement of the person as he or she moves through the visual impairment zone and provide updated information to the device controller to further adjust light beam direction or other properties. Various methods of directing light beams has been discussed above. In some embodiments, the redirection is of a spatial array of light beams may be achieved by altering the light beam pattern divergence angle (the vector angle between separate light beams) to match the target eye locations.

In some examples, the device regulates the spatial array in order to maintain a light beam pattern divergence angle that stays below 40°, below 30°, below 20°, below 10°, or below 6°.

In some embodiments, the tracking element may adjust the separate beams of light 421, 422 based on the distance determined by the tracking element 452 to ensure that the intensity of the light does not exceed the ANSI MPE mandated level.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

All publications, patents, and patent applications cited herein are hereby incorporated by reference in their entirety for all purposes. None is admitted to be prior art.

We claim:

1. A visual impairment device comprising:
   a light source capable of generating two or more high intensity light beams having different peak wavelengths, wherein at least one of the light beams has a wavelength bandwidth of less than 100 nm;
   a modulator for modulating the two or more beams of intense light to produce a spatial array of beams comprising a first array of first light beams having a first peak wavelength and a second array of second light beams having a second peak wavelength different from the first wavelength wherein the first peak wavelength and second peak wavelength are independently selected to fall within a range of 400 nm to 500 nm, a range of 500 nm to 580 nm, or a range of 580 nm to 700 nm; and
   a controller comprising control circuitry for controlling the light source, the modulator, or both,
   wherein the spatial array is projected into a space including a target such that a lateral distance of at least one first light beam to a second light beam is in a range of 40 mm to 110 mm within at least one area of the space including the target such that the first and second light beams are directed into the target's first and second eyes respectively.

2. The device of claim 1, wherein both light beams have a wavelength bandwidth of less than 100 nm.

3. The device of claim 2 wherein at least one light beams has a wavelength bandwidth of less than 50 nm.

4. The device of claim 1, wherein the spatial array further comprises a third array of third light beams having a third peak wavelength different from the first and second peak wavelengths.

5. The device of claim 4, where in the third peak wavelength is selected to fall within a range of 310 nm to 400 nm, a range of 400 to 500 nm, a range of 500 to 580 nm, a range of 580 nm to 700 nm, or a range of 700 to 1500 nm.

6. The device of claim 1, wherein the difference between the first peak wavelength and second peak wavelength is at least 100 nm.

7. The device of claim 1, wherein at least one of the first peak wavelength and second peak wavelength is in a range of 400 nm to 700 nm.

8. The device of claim 1, wherein the device disrupts binocular vision of a person within the at least one area of the space.

9. The device of claim 1, further comprising a projector comprising optics that adjusts properties of the spatial array.

10. The device of claim 1, further comprising a tracking element that identifies a location of a person within the space.

11. The device of claim 1, wherein one or more of the beams of intense light is a laser beam, or a light emitting diode (LED) beam, or a combination thereof.

12. The device of claim 1, wherein the modulator comprises a multiplexer, a beam steerer, a mirror, a prism, a diffraction grating, a beam splitter, or a combination thereof.

13. The device of claim 1, wherein the diffraction grating may be rotated within the modulator.

14. The device of claim 1, wherein the modulator uses a reflective light valve, or a refractive light valve, or a combination thereof for modulating the beam.

15. The device of claim 1, wherein the modulator modulates the two or more beams of intense light by:
   a. splitting a beam of intense light into multiple beams to achieve a static array or a moving array, or a combination thereof;
   b. rastering a beam of intense light to achieve a dynamic array;

c. combining two or more beams of intense light to produce a colinearly propagating light beam to produce a static or a dynamic array;
d. spreading the beam of intense light in at least one direction and scanning the spread light beam in another direction; or
e. any combination of a-d.

16. The device of claim 1, wherein the device can be controlled manually, automatically, remotely or a combination thereof.

17. The device of claim 1, wherein the controller adjusts:
a. a divergence of the beams of intense light;
b. an irradiance of the beams of intense light;
c. peak wavelength for one or more of the beams of intense light;
d. a size of the spatial array;
e. a frequency of a dynamic spatial array;
f. a pattern of the array;
g. a pattern divergence angle of the array
h. a frequency of modulation of a beam; or
i. any combination of a-h.

18. A method of disrupting the binocular vision of a person entering a space, the method comprising
directing a first intense light beam having a first peak wavelength into the person's first eye and directing a second intense light beam having a second peak wavelength different from the first peak wavelength into the person's other eye,
wherein the first and second light beams are provided by a visual impairment device comprising:
a light source that generates two or more high intensity light beams having different peak wavelengths,
a modulator that modulates the two or more high intensity light beams to produce the first and second light beams projected with a lateral distance therebetween that is in a range such that the first and second light beams are directed into the person's first and second eyes respectively, wherein at least one of the light beams has a wavelength bandwidth of less than 100 nm; and
a controller for controlling the light source, the modulator, or both; wherein the first peak wavelength and second peak wavelength are independently selected to fall within a range of 400 nm to 500 nm, a range of 500 nm to 580 nm, or a range of 580 nm to 700 nm.

19. The method of claim 18, wherein the modulator produces a spatial array comprising a first array of first light beams and a second array of second light beams.

20. The method of claim 18, wherein both light beams have a wavelength bandwidth of less than 100 nm.

21. The method of claim 18, wherein the difference between the first peak wavelength and second peak wavelength is at least 100 nm.

22. The method of claim 18, wherein at least one of the first peak wavelength and the second peak wavelength is in a range of 400 nm to 700 nm.

23. The method of claim 18, further comprising tracking the person using a tracking element.

* * * * *